Aug. 20, 1940.  J. MORAN ET AL  2,212,351
APPARATUS FOR USE IN THE BEDDING OF GLASS SHEETS PREPARATORY TO SURFACING
Filed March 11, 1938  3 Sheets-Sheet 2

Inventors
JOHN MORAN.
MICHAEL N KEPLER.

Frank Fraser
Attorney

Patented Aug. 20, 1940

2,212,351

UNITED STATES PATENT OFFICE 2,212,351

APPARATUS FOR USE IN THE BEDDING OF GLASS SHEETS PREPARATORY TO SURFACING

John Moran and Michael N. Kepler, Toledo, Ohio, assignors to Libbey-Owens-Ford Glass Company, Toledo, Ohio, a corporation of Ohio Application March 11, 1938, Serial No. 195,308

15 Claims. (Cl. 51—262)

This invention relates broadly to the securing of glass sheets upon supporting tables preparatory to surfacing and more particularly to the provision of improved apparatus for applying dry plaster around the edges of said sheets to prepare them for the grinding and polishing operations.

In the continuous system for surfacing (grinding and polishing) glass sheets to produce plate glass, a plurality of sheets, mounted upon a series of cars or tables, are passed in a substantially horizontal path successively beneath a series of grinding and polishing elements. The glass sheets are laid end to end upon the tables in slightly spaced relation and the width of the sheets is usually relatively less than the width of the tops of said tables. In order to securely attach the glass sheets to the tables, they are ordinarily imbedded in a layer of plaster of Paris or the like. It is customary to mix the plaster of Paris with water and then pour it upon the tables, with the plaster being spread as uniformly as possible over the tops thereof. The glass sheets are then laid upon the wet plaster and pressed downwardly therein. To facilitate the drying of the wet plaster, not only between adjacent glass sheets but also between the side edges of the sheets and the edges of the tables, it is customary to sprinkle dry plaster upon the wet plaster at such points. Heretofore, the dry plaster has been applied around the edges of the glass sheets manually but such operation is not entirely satisfactory as considerably more than the necessary amount of plaster is used and, in addition, the plaster is ununiformly distributed upon the tables.

The present invention is designed to obviate this waste of plaster as well as to effect a more uniform distribution thereof upon the tables. This is accomplished by the provision of improved apparatus for economically and satisfactorily applying just the proper amount of plaster between adjacent sheets of glass and also between the side edges of the glass sheets and the edges of the tables, to the end that a satisfactory bed for the glass sheets will be secured and the said sheets rigidly and uniformly supported throughout and maintained in the desired position against accidental displacement during the grinding and polishing operations whereby the danger of breakage or the liability of the sheets cracking or becoming displaced will be avoided.

Other objects and advantages of the invention will become more apparent during the course of the following description, when taken in connection with the accompanying drawings.

In the drawings, wherein like numerals are employed to designate like parts throughout the same:

With reference to the drawings, 10 designates a series of cars or tables positioned end to end and movable in a horizontal path to carry the glass sheets 11, mounted thereupon, beneath the grinding and polishing elements (not shown). The glass sheets 11 are laid end to end upon the tables 10 in slightly spaced relation, with the said sheets being of less width than the tops of said tables. The glass sheets are secured to the tops of the tables by imbedding them in a layer of plaster of Paris or the like 12, which is usually formed by mixing dry plaster with water and then spreading the mixture as uniformly as possible over the tops of the tables. While the layer of plaster 12 is still wet, the glass sheets 11 are laid thereon and pressed downwardly thereinto so that when the plaster hardens the said sheets will be firmly secured to the tables.

This invention is particularly concerned with the provision of apparatus for automatically effecting the application of dry powdered plaster to the wet plaster 12 around the edges of the glass sheets as the said sheets are carried forwardly upon the tables so that just the right amount of plaster will be applied and uniform distribution of the plaster obtained, with a consequent saving in the amount of plaster used. The purpose of the dry plaster is to accelerate the hardening of the wet plaster between adjacent sheets of glass and also at the edges of said sheets, as it is desirable that the plaster at these points be hard and set by the time the glass sheets reach the grinding elements in order to minimize the liability of accidental displacement of the glass sheets during the grinding and polishing operations.

The means for applying the dry plaster in the space *a* between adjacent glass sheets 11 is designated in its entirety by the letter A, while the means for applying the dry plaster along the side edges *b* of said sheets comprises the two units B and C arranged at opposite sides of the path of travel of the tables.

Figure 1:
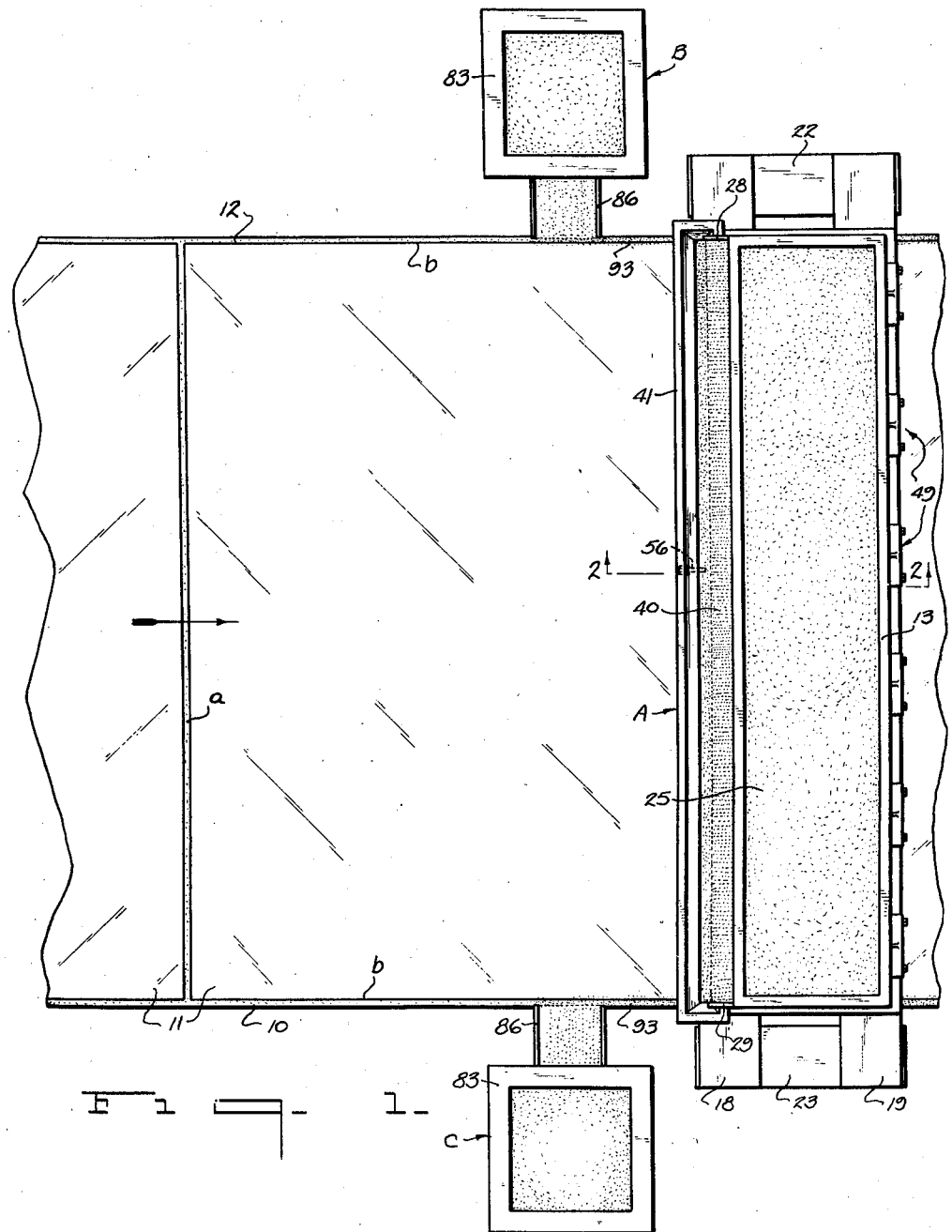
Fig. 1 is a plan view showing the manner in which the glass sheets are laid upon the tables and also illustrating the apparatus provided by the invention for applying the dry plaster to the tables around the edges of the glass sheets.
Figure 2:
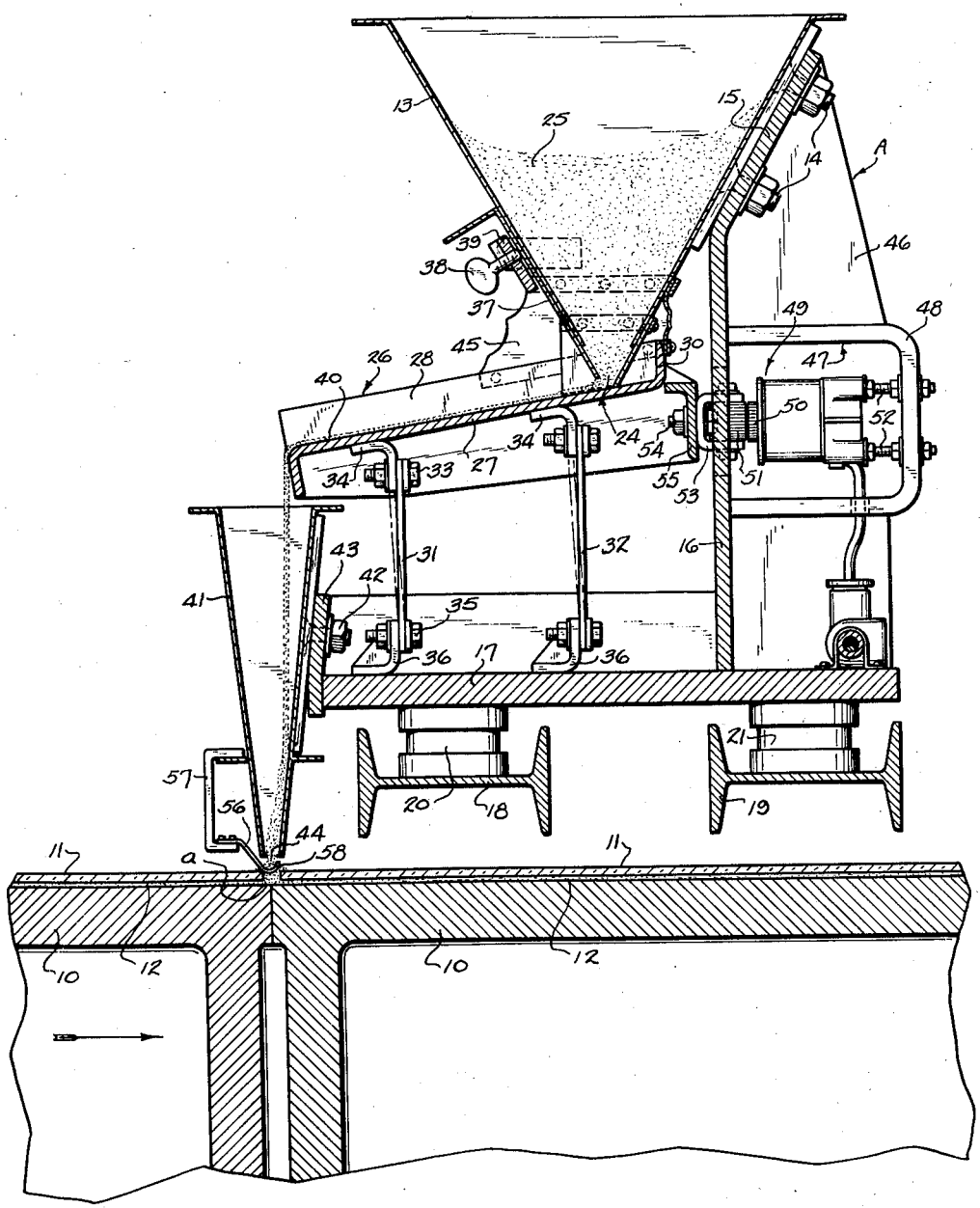
Fig. 2 is a transverse sectional view, taken substantially on line 2—2 of Fig. 1, of the apparatus utilized for applying the plaster between adjacent sheets of glass.

As illustrated in Figs. 1 and 2, the plaster applying means A comprises a supply hopper 13, extending transversely substantially the entire width of the tables 10 and secured by bolts or other suitable fastening means 14 to the upper end 15 of a substantially vertical plate 16 mounted upon a horizontal base 17. The base 17 is supported upon a pair of I-beams 18 and 19 by suitable dampening means 20 and 21 respectively, said I-beams extending transversely of the tables and mounted at their opposite ends upon suitable stationary supports 22 and 23. The supply hopper 13 is substantially V-shaped in cross section and is provided at its lower end with an outlet slot 24 through which the finely divided dry plaster 25 is adapted to flow.

Arranged beneath the hopper 13, to receive the plaster from the outlet slot 24, is a feeder means designated in its entirety by the numeral 26, said feeder means being in the form of a pan extending transversely of the tables and comprising a forwardly and downwardly inclined bottom 27 provided at its opposite ends with upstanding walls 28 and 29 and at its inner edge with an upstanding back wall 30.

The feeder means 26 is supported for horizontal vibratory movement by means of a plurality of pairs of vertical vibrator bars 31 and 32 arranged at spaced points throughout the length of the feeder means, each vibrator bar 31 and 32 being secured at its upper end, by bolts or the like 33, to a bracket 34 carried by the bottom 27 of the feeder means 26 and at its lower end, by bolts or the like 35, to a bracket 36 carried by the base 17. The vibrator bars 31 and 32 are of resilient spring steel so that they are free to flex or vibrate as indicated by the broken lines in Fig. 2.

The outlet slot 24 at the bottom of supply hopper 13 is controlled by a slidable gate 37 adjustable to regulate the amount of plaster flowing from the hopper and adapted to be secured in adjusted position by one or a plurality of thumb screws 38 threaded through a metal strap 39 carried by said hopper. The finely divided dry plaster 25 flows through the outlet slot 24 onto the inclined bottom 27 of the feeder means and is adapted to pass downwardly thereover in a relatively thin layer 40.

Positioned at the forward end of the feeder means 26 and adapted to receive the plaster 40 therefrom is a vertically arranged distributing member 41 in the form of a funnel substantially V-shaped in cross section and having its lower end terminating closely adjacent the tops of the glass supporting tables 10. The distributing member 41 is secured by bolts or the like 42 to a plate 43 carried by the base 17. As shown in Fig. 2, the plaster 40 passing from the forward end of the feeder means 26 is received in the distributing member 41 and is directed thereby into the space *a* between adjacent glass sheets 11 and upon the wet plaster 12 as indicated at 44. If desired, in order to prevent scattering of the dry plaster, there may be provided at the opposite ends and also at the back of the supply hopper 13 a curtain 45 of suitable flexible material which is secured to the said hopper and feeder.

Formed integral with the vertical supporting plate 16 and extending at right angles thereto are a plurality of spaced vertical ribs 46, each being formed intermediate its upper and lower ends with an opening 47 surrounded by a substantially U-shaped frame 48. Associated with each frame 48 is a vibrator 49 having operative connection with the feeder means 26 to effect intermittent rapid vibration thereof. More specifically, the vibrator 49 includes a vibrating motor consisting of a stationary stator having coils 50 and a reciprocating armature 51, an air gap separating the armature from the stator at all times. The stationary stator is secured to the frame 48 by bolts or other suitable fastening means 52, while the armature 51 is carried by a bracket 53 secured by bolts or the like 54 to the part 55 of the plaster feeder means 26. As shown in Fig. 1, a plurality of vibrators 49 are arranged at spaced points transversely of the tables and are connected in series with one another so that they operate in unison.

The stationary stator is in the form of an electro-magnet and the armature 51 moves back and forth under the influence of the stator to effect rapid vibration of the feeder means. Thus, the electrical impulses passing through the coils 50 of the stator create a series of interrupted magnetic pulls, with each magnetic pull attracting the armature 51 and effecting a similar movement of the feeder means 26 which is permitted by the provision of the resilient vibrator bars 31 and 32. Opposing this pull is a restoring force or spring tension built up by the bending of the vibrator bars and this opposing force causes said bars to snap away from the magnet with each interruption or change of the current. Continued vibration of the feeder means will cause the layer of dry plaster 40 to pass slowly downwardly over the bottom 27 of said feeder means and fall from the lower end thereof into the distributing member 41 which deposits it in the space between adjacent glass sheets as previously explained.

According to the invention, the vibrators 49 are adapted to be periodically operated as the tables travel beneath the plaster applying means A so that just the right amount of plaster will be deposited at the right time in the spaces between adjacent sheets of glass whereby to avoid waste of plaster and likewise prevent the discharge of the plaster upon the upper surfaces of the glass sheets themselves. The intermittent operation of the vibrators is automatically controlled by a contact element 56 secured to a bracket 57 carried by the distributing member 41. The lower end 58 of the contact element 56 is curved upwardly and is adapted to ride along upon the upper surfaces of the glass sheets 11 as they are carried forwardly by the tables and to automatically effect the operation of the said vibrators only during the interval of time the said contact element engages the wet plaster 12 in passing from one sheet of glass to the next sheet of glass. To this end, the contact element 56 is positioned so that it will engage the wet plaster between the glass sheets slightly prior to the passage of this strip of wet plaster beneath the lower end of the distributing member 41.

Figure 3:
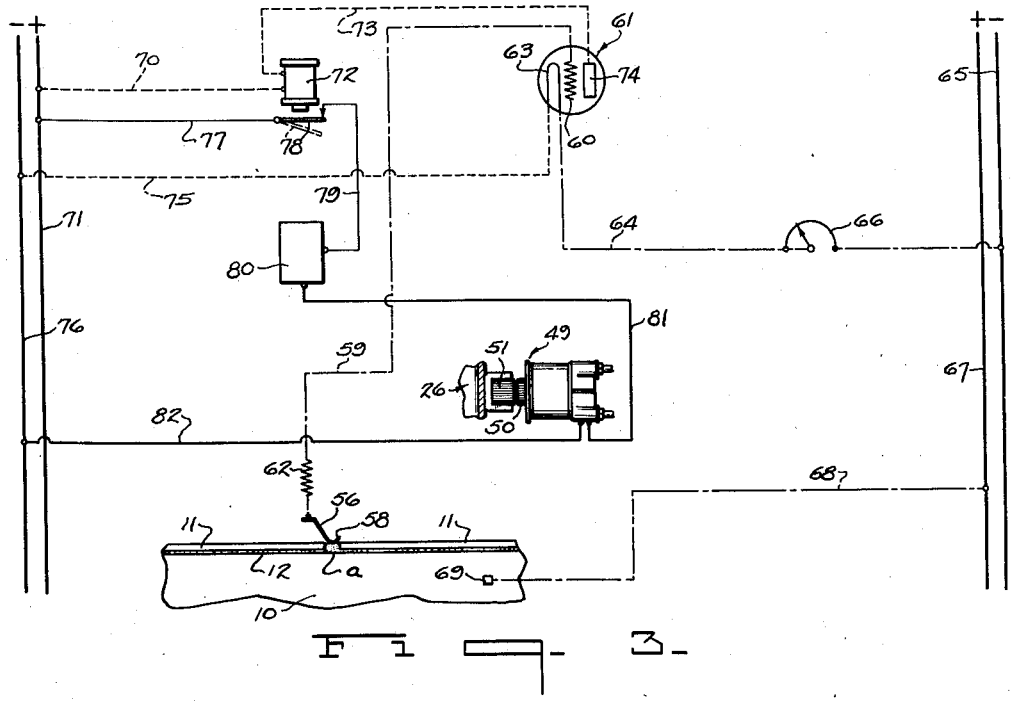
Fig. 3 is a wiring diagram of the electrical means for operating the plaster feeding means of Fig. 2.

The electrical control means for the vibrators 49 is illustrated in Fig. 3 and, as shown therein, the contact element 56 forms part of an electrical circuit hereinafter referred to as the "primary circuit" and comprising a wire 59 leading from the contact element to the grid 60 of an electric tube 61 and, if desired, there may be interposed in the line 59 a resistance 62. The electric tube 61 also includes a filament 63 through which the current passes from the grid 60 to a wire 64 connected to the negative main line 65. A potentiometer or the like 66 is interposed in the line 64 to control the amount of current passing therethrough. The current for the primary circuit is supplied from the positive main line 67 through a wire 68 connected to a suitable contact 69 engaging the metal supporting tables 10.

The primary circuit is a "live" circuit at all times; that is to say, current is continuously passing therethrough since both the glass sheets 11 and wet plaster 12 are conductors of electricity. However, since glass is a relatively poor conductor of electricity, the amount of current passing through the circuit during engagement of the contact element 56 with the glass sheets 11 will be relatively less than the amount of current passing through the circuit during that interval of time in which the said contact element engages the wet plaster 12 in passing from one sheet of glass to the next sheet of glass since the wet plaster is a relatively better conductor of electricity than the glass sheets.

The primary circuit above described is adapted to control the operation of a "secondary circuit" which in turn controls the operation of an "operating circuit" which controls the operation of the vibrators 49. The secondary circuit includes a wire 70 leading from the positive main line 71 to a relay 72 which is connected by a wire 73 to the plate 74 of the electric tube 61. The current passes from the plate 74 to the filament 63 of the tube and thence through a wire 75 to the negative main line 76. The operating circuit includes a wire 77 leading from the positive main line 71 to a switch 78 which is connected by a wire 79 to an amplifier 80 of any desired type and which may consist of a series of relays. Leading from the amplifier 80 to each vibrator 49 is a wire 81, while a second wire 82 connects the vibrator to the negative main line 76.

The secondary circuit is also a "live" circuit at all times, but the resistance normally set up by the grid 60 of the primary circuit, during engagement of the contact element 56 with the glass sheets, prevents sufficient current from passing through the secondary circuit to operate the relay 72 and thus effect the closing of the switch 78 to complete the operating circuit. However, when the contact element 56 engages the wet plaster 12 between adjacent glass sheets, the increased amount of current passing through the primary circuit will lessen the resistance of the grid 60 to the current flowing through the secondary circuit, thereby permitting an increase in the amount of current passing through said secondary circuit sufficient to effect the operation of the relay 72 to close the switch 78 in the operating circuit.

Therefore, during the time the contact element 56 is in engagement with the glass sheets, the switch 78 is in its open, broken line position whereas when the contact element engages the wet plaster 12 in passing from one glass sheet to the next sheet, the switch 78 will be automatically moved to its closed, full line position to complete the operating circuit through the vibrators 49 which automatically places them in operation to actuate the plaster feeder means 26. This vibration of the feeder means will cause the desired amount of plaster 40 to be moved downwardly over the inclined bottom 27 thereof and deposited by the distributor 41 upon the wet plaster 12 between the glass sheets. This operation will continue just so long as the contact element 56 is in engagement with the wet plaster and as soon as said contact element passes from the wet plaster onto the next glass sheet the amount of current passing through the primary circuit will again be automatically reduced thereby increasing the resistance of the grid 60 to the current passing through the secondary circuit resulting in the opening of the switch 78 to break the operating circuit and thus stop the operation of the vibrators.

The potentiometer 66 is adapted to be so regulated that the amount of current allowed to pass through the primary circuit, during engagement of the contact element 56 with the glass sheets, will prevent operation of the relay 72 but which will, at the same time, permit operation of said relay during the time the said contact element engages the wet plaster. Thus, the vibrators 49 are caused to operate only during the passage of the contact element 56 from one sheet of glass to the next sheet of glass and during this period the feeder means will apply just the proper amount of dry plaster to the wet plaster between the glass sheets.

The plaster feeding means B and C positioned at opposite sides of the tables 10 are provided to apply dry plaster upon the wet plaster between the side edges of the glass sheets and the edges of the tables. The feeding means B and C are of substantially the same construction and operation as the plaster feeding means A with the exception that the said feeding means B and C are adapted to operate continuously as the tables 10 are arranged end to end to form a continuous train. Therefore, it is unnecessary to employ the electrical control means illustrated in Fig. 3 and instead the vibrators are caused to operate continuously.

Figure 4:
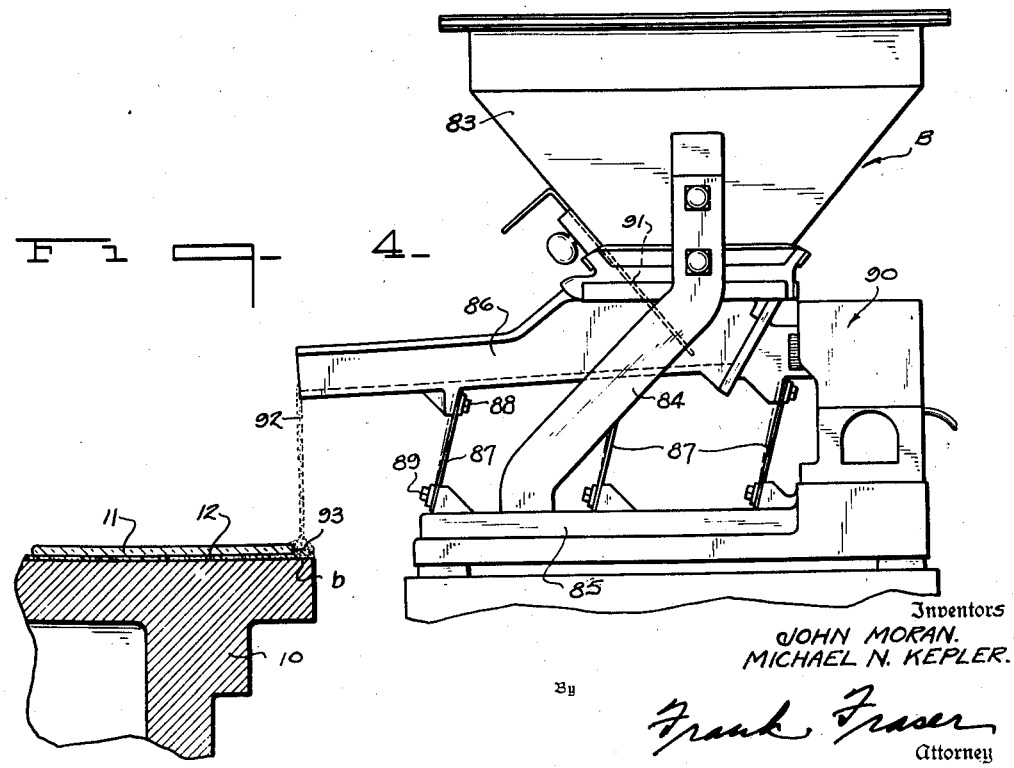
Fig. 4 is a side elevation of the apparatus utilized at each side of the tables for applying plaster along the side edges of the glass sheets.

With reference particularly to Fig. 4, each plaster feeding means B and C includes a supply hopper 83 for the finely divided dry plaster, said hopper being carried by supporting arms 84 mounted upon a base 85. Positioned beneath the hopper, to receive the plaster therefrom, is the vibrating feeder 86 carried by a plurality of vibrator bars 87, said bars being connected at their upper ends, by bolts or the like 88, to the feeder and at their lower ends, by bolts or the like 89, to the base 85. The vibrator bars 87 are of elastic spring steel so as to permit the vibration of the feeder 86 in the same manner as the vibrator bars 31 and 32 shown in Fig. 2.

The vibrator for actuating the feeder 86 is indicated in its entirety by the numeral 90 and as said vibrator may be of the same construction as the vibrators 49 disclosed in Fig. 2, a more detailed description thereof is not thought to be necessary. The amount of plaster flowing from the hopper 83 to the vibrating feeder 86 may be controlled by an adjustable gate 91 and the outer end of the feeder 86 is positioned directly above the adjacent edge of the tables so that the plaster 92 continuously discharged from the outer end of the feeder will be deposited along the outer edge of the glass sheets as indicated at 93 as the said sheets are carried forwardly by the tables.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:
1. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means mounted above the path of travel of said tables for applying dry plaster upon the wet plaster in the space between adjacent sheets of glass as said sheets are carried therebeneath, and means operable automatically when each succeeding table reaches a predetermined position for intermittently operating said plaster applying means.

2. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means mounted above the path of travel of said tables for applying dry plaster upon the wet plaster in the space between adjacent sheets of glass as said sheets are carried therebeneath, and electrically actuated means operable automatically when each succeeding table reaches a predetermined position for operating said plaster applying means.

3. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means mounted above the path of travel of said tables for applying dry plaster upon the wet plaster in the space between adjacent sheets of glass as said sheets are carried therebeneath, and means actuated by movement of said tables for intermittently operating said plaster applying means.

4. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means mounted above the path of travel of said tables for applying dry plaster upon the wet plaster in the space between adjacent sheets of glass as said sheets are carried therebeneath, and electrically operated means actuated by movement of said tables for intermittently operating said plaster applying means.

5. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means for applying dry plaster upon the wet plaster in the space between adjacent sheets of glass including a receptacle containing a supply of dry plaster, feeder means for receiving the plaster from said receptacle, means for mounting said feeder means for vibratory movement, and means operable automatically when each succeeding table reaches a predetermined position for vibrating said feeder means to effect the feeding of the desired amount of plaster between each pair of glass sheets.

6. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means for applying dry plaster upon the wet plaster in the space between adjacent sheets of glass including a receptacle containing a supply of dry plaster, feeder means for receiving the plaster from said receptacle, means for mounting said feeder means for vibratory movement, and electrically operated means operable automatically when each succeeding table reaches a predetermined position for vibrating said feeder means to effect the feeding of the desired amount of plaster between each pair of glass sheets.

7. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means for applying dry plaster upon the wet plaster in the space between adjacent sheets of glass including a receptacle containing a supply of dry plaster, feeder means for receiving the plaster from said receptacle, means for mounting said feeder means for vibratory movement, and means operated by movement of the glass supporting tables for intermittently vibrating said feeder means to effect the feeding of the desired amount of plaster between each pair of glass sheets.

8. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means for applying dry plaster upon the wet plaster in the space between adjacent sheets of glass including a receptacle containing a supply of dry plaster, feeder means for receiving the plaster from said receptacle, means for mounting said feeder means for vibratory movement, and electrically operated means automatically actuated by movement of the glass supporting tables for intermittently vibrating said feeder means to effect the feeding of the desired amount of plaster between each pair of glass sheets.

9. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means for applying dry plaster upon the wet plaster in the space between adjacent sheets of glass including a receptacle containing a supply of dry plaster, feeder means for receiving the plaster from said receptacle, means for actuating said feeder means to cause the feeding of the desired amount of plaster between each pair of glass sheets, and means disposed above the path of travel of the glass supporting tables and adapted to engage the wet plaster between each pair of glass sheets as said tables travel forwardly to effect the operation of said feeder actuating means.

10. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means for applying dry plaster upon the wet plaster in the space between adjacent sheets of glass including a receptacle containing a supply of dry plaster, feeder means for receiving the plaster from said receptacle, electrically operated means for actuating said feeder means to cause the feeding of the desired amount of plaster between each pair of glass sheets, and means disposed above the path of travel of the glass supporting tables and adapted to engage the wet plaster between each pair of glass sheets as said tables travel forwardly to effect the operation of said electrical actuating means.

11. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means for applying dry plaster upon the wet plaster in the space between adjacent sheets of glass including a receptacle containing a supply of dry plaster, feeder means for receiving the plaster from said receptacle, means for actuating said feeder means to cause the feeding of the desired amount of plaster between each pair of glass sheets, and means operatively connected with said feeder actuating means adapted to ride along upon the upper surfaces of the glass sheets as said sheets are carried forwardly and to automatically effect the operation of the said feeder actuating means only during the interval of time the said means engages the wet plaster in passing from one sheet of glass to the next sheet of glass.

12. In apparatus of the character decribed, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, of means for applying dry plaster upon the wet plaster in the space between adjacent sheets of glass including a receptacle containing a supply of dry plaster, feeder means for receiving the plaster from said receptacle, electrically operated means for actuating said feeder means to cause the feeding of the desired amount of plaster between each pair of glass sheets, and a contact element electrically connected with said feeder actuating means adapted to ride along upon the upper surfaces of the glass sheets as said sheets are carried forwardly and to automatically effect the operation of the said feeder actuating means only during the interval of time the said contact element engages the wet plaster in passing from one sheet of glass to the next sheet of glass.

13. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, the width of said sheets being less than the tops of said tables, of means mounted above the path of travel of said tables and operable automatically when each succeeding table reaches a predetermined position for feeding dry plaster upon the wet plaster in the space between adjacent sheets of glass as said tables travel forwardly, and means for feeding dry plaster upon the wet plaster between the side edges of the glass sheets and the edges of the said tables also as said tables move forwardly.

14. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, the width of said sheets being less than the tops of said tables, of means for feeding dry plaster upon the wet plaster in the space between adjacent sheets of glass as said tables travel forwardly, means for feeding dry plaster upon the wet plaster between the side edges of the glass sheets and the edges of the said tables also as said tables move forwardly, mean operable automatically when each succeeding table reaches a predetermined position for intermittently operating the first named plaster feeder means intermittently, and means for operating said second named plaster feeder means continuously.

15. In apparatus of the character described, the combination with a series of tables positioned end to end and movable in a horizontal path to carry glass sheets, mounted thereupon, beneath glass surfacing elements, and a layer of wet plaster upon the tops of said tables forming a bed for the glass sheets and upon which bed the said sheets are laid end to end in slightly spaced relation, the width of said sheets being less than the tops of said tables, of means for feeding dry plaster upon the wet plaster in the space between adjacent sheets of glass as said tables travel forwardly, means for feeding dry plaster upon the wet plaster between the side edges of the glass sheets and the edges of the said tables also as said tables move forwardly, electrically operated means operable automatically when each succeeding table reaches a predetermined position for intermittently vibrating the first named plaster feeder means, and electrically operated means for continuously vibrating said second named plaster feeding means.

JOHN MORAN.
MICHAEL N. KEPLER.